United States Patent [19]

Marsch et al.

[11] 4,387,046

[45] Jun. 7, 1983

[54] ELECTRICALLY CONDUCTIVE ORGANOPOLYSILOXANE ELASTOMERS

[75] Inventors: Wilhelm Marsch, Burghausen, Fed. Rep. of Germany; Dietrich Wolfer, Salzburg, Austria

[73] Assignee: Wacker-Chemie, Munich, Fed. Rep. of Germany

[21] Appl. No.: 27,548

[22] Filed: Apr. 6, 1979

[30] Foreign Application Priority Data

Apr. 18, 1978 [DE] Fed. Rep. of Germany ....... 2816872

[51] Int. Cl.$^3$ ............................................. H01B 1/06
[52] U.S. Cl. .................................... 252/511; 524/495; 524/496; 524/588
[58] Field of Search ................ 252/511; 524/495, 496, 524/588

[56] References Cited

U.S. PATENT DOCUMENTS

| 3,457,537 | 7/1969 | Hines | 252/511 |
|---|---|---|---|
| 3,830,774 | 8/1974 | Jordan et al. | 524/495 |
| 4,051,454 | 9/1977 | Lesser et al. | 250/511 |
| 4,147,855 | 4/1979 | Schiller et al. | 524/588 |

*Primary Examiner*—J. L. Barr

[57] ABSTRACT

An electrically conductive composition containing a cross-linked organopolysiloxane and an electrically conductive lamp black in which the electrically conductive lamp black comprises from 15 to 60 percent by weight based on the weight of the organopolysiloxane of furnace black having a surface area of from 40 to 100 m$^2$/g and from 5 to 25 percent by weight of acetylene black based on the weight of the organopolysiloxane.

9 Claims, No Drawings

ELECTRICALLY CONDUCTIVE ORGANOPOLYSILOXANE ELASTOMERS

The present invention relates to electrically conductive elastomers, particularly to electrically conductive organopolysiloxane elastomers and to a method for preparing the same.

BACKGROUND OF INVENTION

Electrically conductive organopolysiloxane elastomers which are obtained by cross-linking diorganopolysiloxane compositions containing electrically conductive carbon black are described in British Pat. No. 1,027,051 to Imperial Chemical Industries Limited. Also, British Pat. No. 1,473,371 to Wacker-Chemie GmbH, describes cross-linking of diorganopolysiloxanes containing conductive carbon by high energy radiation.

Compared to the above electrically conductive elastomers, the organopolysiloxane elastomers of this invention have certain advantages over the compositions of the prior art. For example, the electrical resistance of the compositions of this invention increases substantially faster with increasing temperatures, i.e., they exhibit a so-called PTC behavior. Moreover, the steep increase in electrical resistance which takes place at lower temperatures can be predetermined and therefore it is possible to attain a higher specific power density.

It is therefore an object of this invention to provide an electrically conductive composition. Another object of this invention is to provide an electrically conductive organopolysiloxane elastomer whose resistance increases substantially with increasing temperatures. Still another object of this invention is to provide electrically conductive elastomers having higher specific power densities. A further object of this invention is to provide a method for preparing electrically conductive organopolysiloxane elastomers having greater increased resistance with increasing temperatures.

SUMMARY OF INVENTION

The foregoing objects and others which will become apparent from the foregoing description are accomplished in accordance with this invention, generally speaking, by providing an electrically conductive composition containing a cross-linkable organopolysiloxane and an electrically conductive lamp black, in which the electrically conductive lamp black comprises from 15 to 60 percent by weight based on the weight of the organopolysiloxane of furnace black having a surface area of from 40 to 100 $m^2/g$ and from 5 to 25 percent by weight of acetylene black based on the weight of the organopolysiloxane. The organopolysiloxane may be cross-linked by the addition of Si-bonded hydrogen to an aliphatic multiple bond or by means of ionization radiation.

DETAILED DESCRIPTION OF INVENTION

These electrically conductive organopolysiloxane elastomers may be prepared by mixing the organopolysiloxane with the electrically conductive lamp black containing from 15 to 60 percent by weight of furnace black, based on the weight of the organopolysiloxane in which the furnace black has a surface area of from 40 to 100 $m^2/g$ and from 5 to 25 percent by weight of acetylene black based on the weight of the organopolysiloxane and thereafter the composition is cross-linked by the addition of organosilicon compounds containing at least 3 Si-bonded hydrogen atoms per molecule or by ionization radiation.

The surface areas described herein are determined by means of nitrogen absorption according to the ASTM Special Technical Bulletin No. 51, 1941, pages 95 and ff. (Generally described as the "Bet" Method.)

The term "furnace black" is also described in the German chemical literature (cf. "Ullmanns Encyklopadie der technischen Chemie", Volume 14, Munich-Berlin, 1963, page 799). When the compositions which are to be cross-linked contain less than 15 percent by weight of furnace black based on the weight of the organopolysiloxane, then the electrical resistance of the resultant elastomers increases very slowly when the temperature increases, and then the electrical resistance is undesirably high in all temperature ranges. If the compositions which are to be cross-linked contain more than 60 percent by weight of furnace black, based on the weight of the organopolysiloxane, then the resultant cross-linked products do not have satisfactory elastomeric properties.

When the surface area of the furnace black is less than 40 $m^2/g$, then the compositions produce elastomers whose electrical resistance is extremely high in all temperature ranges. On the other hand, if the surface area of the furnace black is in excess of 100 $m^2/g$, then the compositions form elastomers whose electrical resistance increases very slowly as the temperature increases. In either case, this results in an unsatisfactory elastomer.

If the compositions which are to be cross-linked contain less than 5 percent by weight, based on the weight of the organopolysiloxane, of acetylene black, then the compositions also form elastomers whose electrical resistance is undesirably high in all temperature ranges. On the other hand, if the compositions which are to be cross-linked contain in excess of 25 percent by weight of acetylene black, based on the weight of the organopolysiloxane, then the resultant compositions are too difficult to process.

The surface of the acetylene black is not critical and may range for example from 40 to 1200 $m^2/g$.

The greater the weight ratio of acetylene black to furnace black, the higher the temperature at which the electrical resistance begins. It then increases steeply as the temperature increases. This temperature is referred to by those knowledgeable in the art as the switch temperature, anomaly temperature or the Curie point. With elastomers prepared in accordance with this invention, the temperature is in the range of from 80° to 180° C.

It is preferred that the compositions which are to be cross-linked in the process of this invention contain from 20 to 40 percent by weight of furnace black, based on the weight of the organopolysiloxane, and a total of from 25 to 50 percent by weight, based on the weight of the organopolysiloxane, of electrically conductive lamp black.

The organopolysiloxanes used in the compositions of this invention may be any diorganopolysiloxanes which could have been used heretofore in diorganopolysiloxane-based compositions containing electrically conductive lamp black which could be cross-linked to form electrically conductive organopolysiloxane elastomers by the addition of Si-bonded hydrogen to aliphatic multiple bonds or through ionization radiation. Diorganopolysiloxanes which may be used are especially those of the general formula:

in which R represents the same or different, monovalent or substituted monovalent hydrocarbon radicals having up to 18 carbon atoms and n is an integer having a value of at least 10.

Although this is generally not shown in the formula illustrated above, the siloxane chain of the aforementioned diorganopolysiloxanes may contain siloxane units in addition to the diorganosiloxane units ($SiR_2O$). Examples of such other siloxane units which are generally present only as impurities, are those corresponding to the formulas $RSiO_{3/2}$, $R_3SiO_{1/2}$ and $SiO_{4/2}$, where R is the same as above. It is however preferred that such other siloxane units be present in an amount less than 1 mol percent. Still other siloxane units, for example those of the formula —$SiR_2R'SiR_2O$—, where R is the same as above and R' is a bivalent hydrocarbon radical, for example a phenyl radical, may be present in larger amounts.

It is preferred that the substituted hydrocarbon radicals represented by R contain from 1 to 8 carbon atoms.

Examples of hydrocarbon radicals represented by R are alkyl radicals, for example the methyl and ethyl radical, as well as propyl, butyl, hexyl and octadecyl radicals; alkenyl radicals such as the vinyl, allyl, ethylallyl and butadienyl radicals; aryl radicals such as the phenyl radical; alkaryl radicals such as the tolyl radicals; and aralkyl radicals such as the beta-phenylethyl radicals.

Examples of substituted monovalent hydrocarbon radicals represented by R are halogenated hydrocarbon radicals, such as the 3,3,3-trifluoropropyl radical, chlorophenyl and bromotolyl radicals; and cyanalkyl radicals, such as the beta-cyanoethyl radical.

Because of their availability, it is preferred that at least 80 percent of the R radicals be methyl radicals.

Preferred diorganopolysiloxanes are those having trimethylsiloxy or vinyldimethylsiloxy groups as terminal units and contain from 0.01 to 5 mol percent of methylvinylsiloxane units. More preferably the diorganopolysiloxanes are those containing from 0.1 to 2 mol percent of methylvinylsiloxane units and the remaining diorganosiloxane units are dimethylsiloxane units.

When the compositions are to be cross-linked by the addition of Si-bonded hydrogen to an aliphatic multiple bond, it is necessary that the diorganopolysiloxane which constitutes the base of the composition contain at least two alkenyl radicals for each molecule of diorganopolysiloxane.

The viscosity of the diorganopolysiloxane used in the preparation of the compositions of this invention is preferably 100 mPa at 25° C. and more preferably at least $10^5$ mPa at 25° C.

When the compositions are to be cross-linked by the addition of Si-bonded hydrogen to an aliphatic multiple bond, then the composition must contain in addition to the electrically conductive lamp black and the diorganopolysiloxane containing alkenyl radicals, at least one organosilicon compound having at least 3 Si-bonded hydrogen atoms per molecule and a catalyst which promotes the addition of Si-bonded hydrogen to aliphatic multiple bonds.

The organosilicon compounds containing at least 3 Si-bonded hydrogen atoms per molecule are generally organopolysiloxanes, especially methylhydrogenpolysiloxanes.

The organosilicon compounds having at least 3 Si-bonded hydrogen atoms per molecule are preferably used in amounts of from 0.5 to 20 percent by weight, based on the weight of the diorganopolysiloxane containing alkenyl radicals.

Examples of catalysts which promote the addition of Si-bonded hydrogen to aliphatic multiple bonds are metallic and finely dispersed platinum, ruthenium, rhodium, palladium and iridium. These metals may be dispersed on carriers, such as the lamp black used in accordance with this invention, silicon dioxide, aluminum oxide or activated carbon. Furthermore, it is possible to use compounds or complexes of these metals, such as $PtCl_4$, $PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, for example the reaction product of $PtCl_6 \cdot 6H_2O$ and cyclohexanone; platinum-vinylsiloxane complexes, especially platinum-divinyl-tetramethyldisiloxane complexes with or without any detectable, inorganically bonded halogen, bis-(gamma-picoline)dichloride, trimethylenedipyridine platinum dichloride; as well as iron, nickel and cobalt carbonyls.

When one of the above metals, compound and/or complex of said metals is used as a catalyst to promote the addition of Si-bonded hydrogen to aliphatic multiple bonds, then such catalysts are preferably used in amounts of from 0.5 to 500 ppm (parts per million, by weight), calculated as the metallic element and based on the weight of the diorganopolysiloxane containing alkenyl radicals.

In addition to the diorganopolysiloxane which constitutes the base of these compositions, the electrically conductive lamp black and possibly an organosilicon compound containing at least 3 Si-bonded hydrogen atoms per molecule, and a catalyst which promotes the addition of Si-bonded hydrogen to aliphatic multiple bonds, the compositions of this invention may contain additional substances such as could have been used heretofore in the preparation of diorganopolysiloxane-based compositions containing electrically conductive lamp black, for the preparation of electrically conductive organopolysiloxane elastomers by the addition of Si-bonded hydrogen to aliphatic multiple bonds or by ionization radiation. Examples of reinforcing and non-reinforcing fillers other than furnace black and acetylene black which may be used are heat-stabilizers, antioxidants, processing aids such as organopolysiloxanes containing Si-bonded hydroxyl groups and having a maximum of 100 Si atoms per molecule, agents which retard cross-linking and plasticizers, as well as substances which serve to improve the adhesion of the elastomers to the bases on which they are prepared.

Examples of plasticizers are especially trimethylsiloxy end-blocked dimethylpolysiloxanes having a maximum of 1000 Si atoms per molecule.

Examples of reinforcing fillers other than furnace black and acetylene black which may be incorporated in the compositions of this invention are pyrogenically produced silicon dioxide, silicic acid hydrogel which has been dehydrated while maintaining its structure, silicic acid xerogels, pyrogenically produced aluminum oxide and pyrogenically produced titanium dioxide.

Examples of non-reinforcing fillers which may be used are calcium carbonate, quartz meal and diatomaceous earth.

The compositions of this invention may also contain fibrous fillers, such as glass fibers having an average length up to about 0.5 mm, and/or asbestos fibers.

All of the previously cited fillers, including the various types of lamp black, or a portion of said fillers may have organopolysiloxane groups on their surfaces. This can for example be achieved by treating a portion of the fillers with hexamethyldisilazane either before or after they have been mixed with the diorganopolysiloxanes which form the base of these compositions.

Examples of agents which retard cross-linking of these compositions which may be included therein are benzotriazole and alkinols.

An example of agents which may be used to improve the adhesion of the elastomers to the surfaces on which they are applied is glycidyloxypropyltrialkoxysilane.

The compositions of this invention may be prepared by mixing the various components in any sequence. The resultant compositions are preferably shaped by extrusion.

The temperature at which the compositions are cross-linked by the addition of Si-bonded hydrogen to aliphatic multiple bonds is not critical. However, it is preferred that the temperature be in the range of from 18° to 250° C., and more preferably the temperature may be in the range of from 80° to 200° C. Cross-linking may be further accelerated by the use of ultraviolet or infrared rays.

When the compositions are cross-linked by means of ionization radiation only, such radiation may consist of ultraviolet, X-ray, alpha, beta and/or gamma radiation. When the compositions are to be cross-linked exclusively by radiation, a dose of from 5 to 8 regarad is preferred.

The compositions of this invention may be used, for example in the preparation of electrically conductive plates, coatings, bands and films.

In the following examples, all parts and percentages are by weight unless otherwise specified.

The platinum-ketone complex solution used in the following examples was prepared in the following manner.

One gram of $H_2PtCl_6.6H_2O$ is added to 200 g of cyclohexanone which has been heated to 80° C. The solution is maintained at 80° C. for 45 minutes and then dried with the aid of anhydrous sodium sulfate.

EXAMPLE 1

About 100 parts of trimethylsiloxy end-blocked diorganopolysiloxanes which consist of 99.5 mol percent of dimethylsiloxane units and 0.5 mol percent of vinylmethylsiloxane units and having a viscosity of $5 \cdot 10^6$ mPa at 25° C. are first mixed with 7 parts of hydroxyl terminated dimethylpolysiloxanes having a viscosity of 40 mPa at 25° C., then with 40 parts of silicon dioxide having a surface area of 200 m²/g which was pyrogenically obtained in the gaseous phase, and 40 parts of furnace black having a surface area of 80 m²/g (additional properties of the furnace black; nigrometer value: 90; average particle size: 27 millimikrometer; volatile components: 2 percent; pH value 9) and 5 parts of acetylene black having an average surface area of 250 m²/g; and then with 15 ppm of the platinum solution prepared above. The resultant mixture is then mixed with 3 parts of trimethylsiloxy end-blocked methylhydrogenpolysiloxanes having a viscosity of 40 mPa at 25° C. The mixture thus obtained is then extruded to form a film which is then heated to 170° C. for 10 minutes and to 200° C. for 4 hours.

At zero load and with external heating, as the temperature rises from 20° to 80° C., the electrical resistance rises from 1300 Ohm.cm to 1400 Ohm.cm and when the switch temperature rises from 80° C. to 120° C., the electrical resistance rises from 1400 Ohm.cm to over $10^6$ Ohm.cm. Even after several weeks exposure to high temperatures under direct heating conditions, there is no change in the specific electrical resistance.

EXAMPLE 2

The procedure described in Example 1 is repeated, except that 20 parts of furnace black and 5 parts of acetylene black are used.

At zero load and with external heating, as the temperature rises from 20° to 70° C., the electrical resistance rises from 110 Ohm.cm to 140 Ohm.cm, and when the switch temperature rises from 170° C. to 240° C., the electrical resistance rises from 140 Ohm.cm to $10^6$ Ohm.cm.

What is claimed is:

1. A composition which when cured provides an elastomer capable of conducting electrically comprising an organopolysiloxane having the formula $$R_3SiO(SiR_2O)_nSiR_3$$

where R is selected from the group consisting of monovalent hydrocarbon radicals and substituted monovalent hydrocarbon radicals having up to 18 carbon atoms and n has a value of at least 10, which is capable of being cross-linked by the addition of Si-bonded hydrogen to an aliphatic multiple bond or by means of ionization radiation and as an electrically conductive lamp black from 15 to 60 percent by weight based on the weight of the organopolysiloxane of furnace black having a surface area of from 40 to 100 m²/g and from 5 to 25 percent by weight of acetylene black, based on the weight of the organopolysiloxane.

2. The composition of claim 1, wherein from 20 to 40 percent by weight of furnace black is present based on the weight of the organopolysiloxane.

3. The composition of claim 2, wherein a total of from 25 to 50 percent by weight of the conductive lamp black is present based on the weight of the organopolysiloxane.

4. The composition of claim 1, wherein the acetylene black has a surface area of from 40 to 1200 m²/g.

5. The composition of claim 1, wherein the organopolysiloxane contains at least two alkenyl radicals for each molecule and the composition further contains an organosilicon compound having at least 3 Si-bonded hydrogen atoms per molecule and a catalyst which promotes the addition of Si-bonded hydrogen to aliphatic multiple bonds.

6. A method for curing the composition of claim 1 which comprises subjecting said composition to ionization radiation.

7. The cured composition of claim 5.

8. The cured composition of claim 6.

9. A method for curing a composition which is capable of conducting electricity which comprises adding an organosilicon compound having at least 3 Si-bonded hydrogen atoms per molecule and a catalyst which promotes the addition of Si-bonded hydrogen to aliphatic multiple bonds to a mixture containing an organopolysiloxane having the formula $$R_3SiO(SiR_2O)_nSiR_3$$

where R is selected from the group consisting of monovalent hydrocarbon radicals and substituted monovalent hydrocarbon radicals having up to 18 carbon atoms and n has a value of at least 10, in which the organopolysiloxane contains at least two alkenyl radicals for each molecule and an electrically conductive lamp black containing from 15 to 60 percent by weight based on the weight of the organopolysiloxane of furnace black having a surface area of from 40 to 100 m$^2$/g and from 5 to 25 percent by weight of acetylene black, based on the weight of the organopolysiloxane and thereafter curing the composition at a temperature of from 18° to 250° C.

* * * * *